Oct. 23, 1951  T. WATT  2,572,411
RESILIENT SUPPORT FOR ANTIFRICTION BEARINGS
Filed Nov. 16, 1948  2 SHEETS—SHEET 1
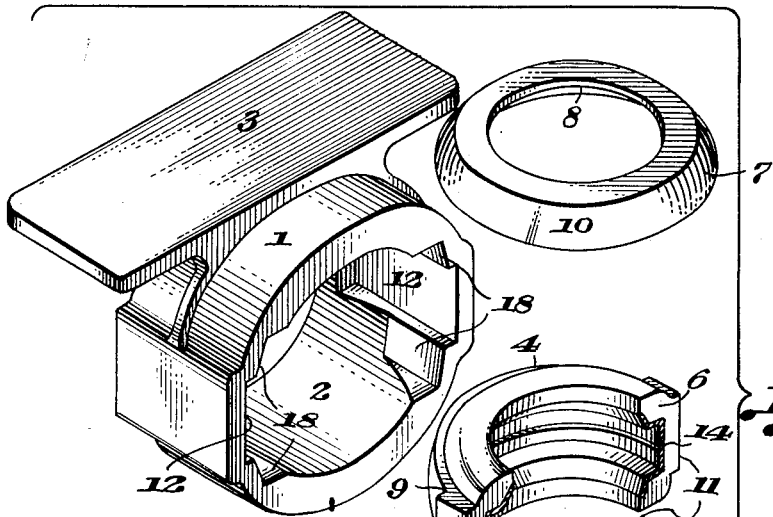
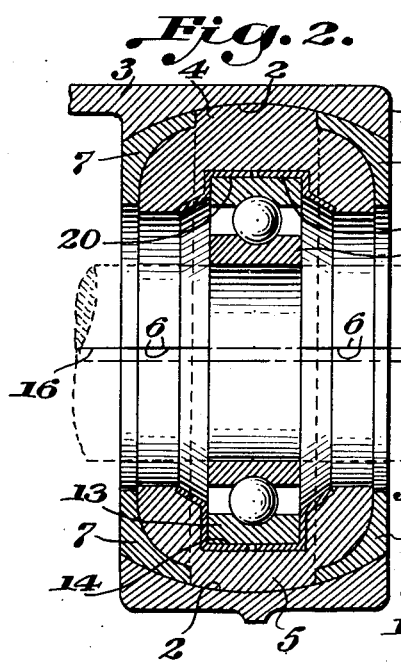
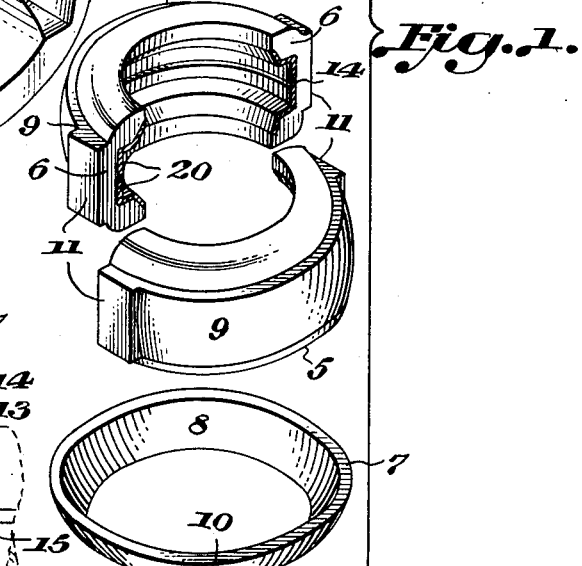
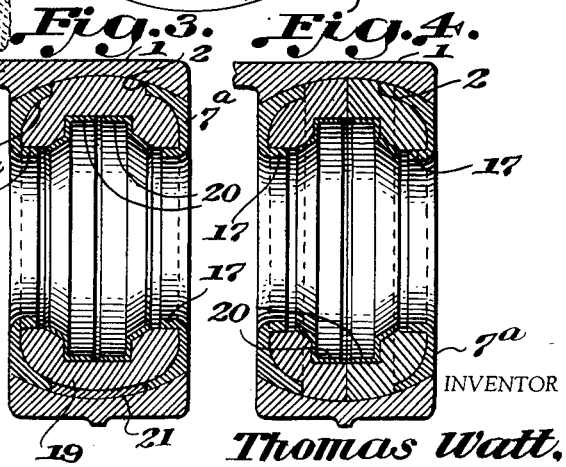
INVENTOR
Thomas Watt,
BY Wanderoth, Lind & Ponack
ATTORNEYS

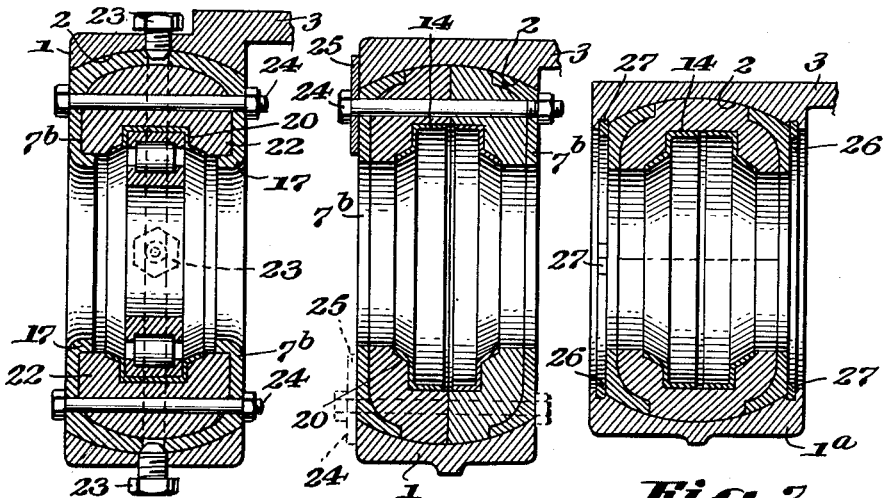

UNITED STATES PATENT OFFICE 2,572,411

RESILIENT SUPPORT FOR ANTIFRICTION BEARINGS

Thomas Watt, Berea, Johannesburg, Transvaal, Union of South Africa

Application November 16, 1948, Serial No. 60,346
In Great Britain November 17, 1947

20 Claims. (Cl. 308—184)

This invention relates to improvements in the mounting of ball or roller bearings and to bearing assemblies formed therewith, and is an improvement in or development of a known construction.

According to this known construction a ball or roller bearing is mounted in a rigid housing by means of a split annular bushing of resilient material such as rubber which bushing is lined internally with a rigid material such as metal and encircles said bearing which is a tight fit in an accommodating recess in said housing, said recess being of part-spherical shape in cross-section adapted to fit the correspondingly shaped periphery of the bushings whereby the outer race of the bearing is resiliently gripped and thereby held against rotary movement whereby the bearing as a whole is given a self-aligning characteristic. In cross-section the said recess in the housing is of arcuate shape, whereby the tendency is for the bushing after insertion to be squeezed inwardly or contracted so that at all times it exerts a resilient gripping action on the aforesaid outer race of the bearing.

The bushing may be split in a plane parallel with or at right angles to the axis thereof. The housing may be in one piece or it may be split similarly to the bushing and arrangements made for bolting or otherwise securing the two parts together after insertion of the bushing with the bearing in the accommodating process.

It has been found that while these constructions are suitable for light and medium bearing loads, they are not so suitable for heavy bearing loads such as those which are experienced in the axle bearings of railway rolling stock and heavy machinery. One reason is that the rubber or like material, of which the bushing is made tends to "flow" or become displaced in lateral directions when subjected to heavy bearing loads, which displacement results in mis-alignment of the shaft or the like which is journalled in the bearing. In addition, with heavy bearing loads wear takes place on the outer surface of the rubber or like bushing which co-acts with the accommodating recess of the rigid bearing housing, especially when such recess is of part-spherical shape in cross-section to give full self-aligning characteristics to the bearing. The improvements now to be described aim at overcoming these disadvantages.

According to the present invention a bearing block of the kind referred to, is characterised in that the resilient bushing, in addition to being lined internally with a rigid material, is partly encased as regards its outer surfaces by means of a pair of opposing rigid casing members which are shaped exteriorly to fit the accommodating annular recess in the rigid bearing housing, whereby excessive "flow" of the material of the bushing is prevented and the outer surfaces thereof are protected against rapid or excessive wear.

The construction is such that the bushing is sandwiched between the inner rigid lining and the outer rigid casing members, which lining and casing members are not directly connected to one another. The inner rigid lining is preferably split into two half-parts to facilitate assembly of the several parts of the bearing and to allow of axial compression for purposes of gripping the outer race of the ball or roller bearing. Preferably also the inner lining and/or the outer casing members are permanently bonded to the bushing in known manner.

The inner lining is preferably split into two half parts across a plane disposed at right angles to the axis of the bearing so that these half parts are of hollow annular form. Alternatively they may be split across a diametrical plane.

According to a preferred form of bearing block or journal, constructed according to the invention, the outer peripheral surfaces of the two outer casing members are of part-spherical form and are arranged to fit snugly into a correspondingly shaped internal accommodating recess in the bearing block housing, so that sliding movement between these surfaces and the surface of the said accommodating recess is possible, whereby the bearing block is fully self-aligning. When the two opposing inner lining half parts and the two opposing outer casing parts are bonded to the rubber bushing, spaces are left between their inner opposing edges and their outer edges to allow for pre-stressing of the rubber or like material of the bushing and to allow resilient gripping of the outer race of the bearing. This construction also permits a certain restricted amount of "flow" of the bushing material when under load so as to give a resilient mounting to the shaft journalled in the bearing.

Both the inner lining half parts and the outer casing members are provided on their outer sides with inwardly directed flanges so that the cross-sectional shape thereof is of substantially channel form. Preferably both inner lining half parts and both outer casing members are of metal.

In cases where it is desired to have a fixed bearing block or journal not having full self-aligning characteristics, fixing devices such as those known as circlips, are arranged to be inserted in suitable grooves in the bearing housing at each side and in contact with the outer surfaces of the flanges of the two outer casing members so as to prevent relative oscillating movement of the ball or roller bearing assembly with respect to its accommodating part-spherical recess in the housing. Alternatively the bearing housing may be split into two half parts in the same plane as the outer casing members and by arranging for said parts to be bolted or clamped together, a compressing or gripping action may be imparted to the outer casing members for the purposes referred to above.

According to a further feature of the invention, arrangements are made for applying more axial compressive pressure to one side of the bushing than to the diametrically opposite side, so as thereby to cause displacement of the ball or roller bearing in a direction at right angles to the axis thereof for purposes of adjusting the alignment of a shaft or the like journalled in the bearing, or for purposes of counteracting such displacement of the bearing. It will be understood that generally the lower half of the bushing is subjected to substantially greater bearing pressure than the upper half with the result that under certain conditions the axis of the shaft or the like tends to be displaced downwardly.

By increasing the axial compressive pressure on the lower half of the bushing, the rubber or like material of the bushing is caused to "flow" beneath the lower side of the outer race of the ball or roller bearing and thereby to raise the bearing as a whole to correct or compensate, to a limited extent, for any slight out of alignment displacement of the shaft or the equivalent due to the resilience of the material of the bushing.

According to one method of achieving this result, adjusting studs or the like passing through tapped holes in a fixed part of the bearing housing, are arranged so that their inner ends, by bearing against the outer casing members, are adapted to cause inward canting movement thereof so as to increase the compressive pressure on the material of the bushing sandwiched between them, at for instance the bottom side of the bearing. Suitable recesses, shoulders or the like are provided on the outer casing members to receive the ends of the studs or the equivalent.

According to another method of achieving differential compression of the bushing, the inner ends of said adjusting studs or the equivalent are arranged to engage in recesses in a pressure ring let into an annular recess on the outside of each outer casing member. These pressure rings which are rotatable in these recesses, permit creeping rotary movement of the ball or roller bearing assembly which thereby allows of even wear of the bearing surfaces taking place.

According to yet a further feature of the invention one half of the bushing is made of harder rubber or like material than the other half, and this harder half is arranged to take the bearing pressure. In the usual arrangement the bottom half of the bushing will be made of the harder material. According to a further modification bosses or like projections on the outer periphery of the bushing are arranged to engage in corresponding recesses provided in the accommodating annular recess of the bearing housing so as to prevent any creeping rotary movement of the bushing as a whole.

In order that the present invention may be more clearly understood and carried into practice, reference is now made to the accompanying drawings in which like reference numerals refer to like parts throughout the several views.

In the drawings:

Figure 1 is an exploded isometric view of an axle bearing constructed according to the present invention;

Figure 2 is a vertical cross-section of the assembled axle bearing shown in Fig. 1;

Figures 3 and 4 are vertical cross-sections of modified constructions of self-aligning axle bearings constructed according to the present invention;

Figures 5, 6, 7, 8 and 9 are vertical cross-sections of modified forms of construction of non self-aligning axle bearings, constructed according to the present invention; and Figures 10 and 11 are vertical cross-sections of a light railway truck axle and wheels showing two methods of application of the bearing shown in Figs. 1 and 2.

Referring to Figs. 1 and 2 of the drawings, the bearing housing, denoted by reference numeral 1, is provided with a part spherical inner surface 2. The bearing, like all the bearings illustrated in the accompanying drawings, is intended for axle bearings for light railway rolling stock and consequently has a fixing flange 3 on the top side thereof for fixing to the chassis of the truck or the like.

The annular resilient bushing comprises two co-acting parts 4 and 5 which have the abutting faces 6 arranged parallel to the axis thereof. The outer surface of the co-acting resilient bushings 4 and 5 is partly encased by a pair of annular casing members 7. The outer surfaces of the resilient bushings 4 and 5 and the inner surface 8 of the annular casing members 6 are correspondingly shaped so that the outwardly disposed uncovered surface 9 of the said bushings 4 and 5 and the curved outwardly directed surface 8 of the casings 7 form a continuous part-spherical surface. The bushing members 4 and 5 are provided with outwardly extending bosses 11 which are arranged to engage in corresponding recesses 12 provided in the accommodating annular part spherical recess 2 of the housing 1.

In the particular construction shown in Figs. 1 and 2, the ball or roller bearing 13 is adapted to be located in the annular groove 14 of the bushing parts 4 and 5. The annular groove 14 of the bushing 4 which is subjected to the maximum pressure, is of lesser depth than the depth of the annular groove 14 of the lower bushing part 5 so that in the assembled state of the bearing, the axis 15 of the axle will not be concentrically disposed with the centre line 16 of the bearing housing (see Fig. 2). The annular groove 14 of the bushing parts 4 and 5, when placed in the co-acting positions, will coincide and form a continuous smooth annular groove for the reception of the metal inner lining parts 20 which lining parts in turn locate the ball-race 13.

The insertion of the bushings 4 and 5 with the associated outer casings 7, ball-race 13 and inner lining parts 20 into the housing is effected by firstly assembling all such parts together and inserting them into the housing at right angles to the final position. After insertion of the bushings and associated parts such bushings and parts are bodily turned through an angle of 90° so that the co-acting part spherical surfaces 9 and 10 and 2 engage with one another. The notches 18 in one side of the housing 1 permit the initial insertion of the bosses 11 of the assembled bushings 4 and 5 and outer casing members 7. The casing members 7, housing 1 and ball-race 13 partly encase the resilient bushing parts 4 and 5 and thus prevent excessive "flow" thereof when subjected to pressure.

The bearing block illustrated in Fig. 3 is of substantially the same construction as the bearing block shown in Figs. 1 and 2, except that the outer casing members 7a are provided with inwardly directed annular lips 17 which encase the inwardly directed annular surfaces of the bushing parts 19 to prevent excessive "flow" thereof in the direction towards the axle or shaft. The bearing block shown in Fig. 3 is provided with two identical resilient bushings 19 which are split along a diametrical plane. Said bushings 19 are substantially similar to the bushings 4 and 5 but have a ball-race locating groove of equal depth in both parts. The bushings 19 are also provided with metallic inner lining parts 20 in which the ball-race is contained. Said lining parts 20 are split along a plane perpendicular to the axis thereof. A further feature associated with the modification shown in Fig. 3 consists in the spacing element 21 acting between the inwardly directed circumferential edges of the casing members 7a. The said spacing element 21 is located in a transverse recess in the part spherical surface 9 of a bushing 19 and prevents movement of such casing members 7a towards one another. Said spacing element is located in the bushing which is subjected to the least pressure by the load so that parting action of the casing members 7a due to flow or spreading of the opposing resilient bushing parts 19 due to the load, is prevented.

If desired, said spacer 21 may be bonded to the resilient bushing parts 19 in any convenient manner, and more than one spacer 21 may readily be used if so desired. The spacer 21 may of course also be incorporated in the bearing blocks shown in Figs. 1 and 2.

Fig. 4 shows a bearing substantially similar to the bearing shown in Fig. 3 but having resilient bushings 22 which are split along a central plane at right angles to the axis of the bearing block. The meeting edges of the two half lining parts 20 of the inner ball-race lining are slightly spaced to allow for axial compression for purposes of gripping the outer race of the ball or roller bearing. The bearing block may also be provided with one or more spacing or distance pieces 21 in order to keep the opposing outer casing faces substantially parallel with one another notwithstanding the tendency to be displaced by the flow of the resilient material when subjected to load.

All the bearings illustrated and described with reference to Figs. 1, 2, 3 and 4 are self-aligning. Figs. 5, 6, 7, 8 and 9 illustrate non self-aligning or restricted self-aligning bearings, but those shown in Figs. 5, 8 and 9 can nevertheless have their alignment readily adjusted due to the embodiment therein of the self-aligning feature previously described.

Referring to Fig. 5, the outer casing members 7b are adapted to almost entirely cover the outwardly disposed surface of the resilient bushings 22. The edges of the casing members 7b are, however, located in spaced relationship with one another and are adapted to be engaged by conically pointed studs 23 provided in the bearing housing whereby the inward tilting of the sides of the casing members positioned on the diametrically opposite side from the direction of the load, is prevented. In addition to the said studs 23, axial bolts 24 may be provided to locate the casing members 7b in parallel relationship with one another. In such construction the studs 23 merely centre the bushing and roller bearing within the housing 1. However, such studs 23 may be discarded if a fully self-aligning bearing is desired in which case the bolts 24 prevent spreading or "flow" of the bushing parts 22 and independent canting of the casing members 7b.

Figure 6 shows a modified form of construction of bearing block also having axial bolts 24 which prevent canting of the casing members 7b with respect to one another. The modification resides in the provision of at least one plate 25 which bears against one of the outside faces of the housing in order to locate the bushing and roller bearing in a non self-aligning fashion. One plate would permit a tilting action of the bushing and associated parts in the direction of arrow A, but on fixing said plate 25 to the housing such movement will be prevented. Alternately, a plate 25 can be provided on the diametrically opposite side of the housing. If more than one bolt 24 is provided (as is shown in broken line in Fig. 6) at least one of such plates 25 cannot be fixed to the housing on the same side of the bearing, as the turning of the bushing assembly to the operative position would be obstructed thereby.

Figure 7 illustrates a modified bearing block in which the resilient bushing and casing members 7 are located between circlips 26 after the said bushing assembly has been tilted to its operative position in the housing 1a. The circlips 26 engage in annular grooves 27 provided in the inside surface of the housing adjacent the ends thereof and retain the bearing assembly in the operative position.

Figure 8 illustrates a bearing housing which consists of two parts 28 and 29 which are secured together by bolts 30. Each bearing housing part 28 and 29 is provided with an inwardly directed flange 31 on the outside which is provided with tapped holes for locating adjusting studs 32. The inner ends of said studs 32 engage the outwardly directed face of the casing members 7 and are adapted to cause canting movement of the bushing assembly so as to cause alignment of the roller bearing and also to increase the compressive pressure on the material of the bushings sandwiched between the said casing members 7. The studs 32, if desired, may be obliquely located in order to be disposed substantially tangentially to the canting or tilting action of the bushing assembly.

Referring to Fig. 9, which illustrates a modification of a bearing block substantially similar to that illustrated in Fig. 8, adjusting studs 32a are provided which are located obliquely to the face of the housing parts 28a and 29a. The said studs 32a are arranged to engage annular recesses 35 provided in shallow disked pressure rings 33 which in turn are let into annular recesses provided in each of the outer casing members of the bushings 7d. The said pressure rings 33 are rotatable in the recesses 34 in order to permit creeping rotary movement of the ball or roller bearing assembly, thus allowing for even wear of the bearing surfaces.

In Fig. 10 the bearing shown in Figs. 1 and 2 is applied to a light railway truck axle. The grease seals 36 can conveniently consist of a felt washer and a rubber or like resilient material washer encased in an annular metallic casing. The seals 36 are in rubbing engagement with one another and with a collar 37 or the like which is welded to the axle 49. The grease seals 36a located between the bearing and wheel 38 are similar to seals 36.

The wheel 38 is provided with an annular cavity 39 in its hub 40 and is adapted to act as a grease reservoir. Said reservoir 39 is connected by ducts 41 to the bearing for transfer of the lubricant. The reservoir 39 is adapted to be filled through a grease nipple 42 or the like.

In Fig. 11 the bearing is placed on the outside of the wheel 43 and is provided with a cover plate 44 which is fixed by means of screws or the like to the outer casing members 7 in order to form a closure for the bearing. Said plate 44 is provided with a grease nipple 45 for introducing the lubricant into the bearing. The hub 46 of the wheel 43 is also provided with an annular grease reservoir 39 which communicates with the bearing by means of a duct 47 or the like in the axle 48.

What I claim is:

1. An improved bearing block comprising a rigid housing and an antifriction bearing mounted in said housing, a split annular bushing of resilient material lined internally with a rigid material encircling said bearing, said housing having an annular recess therein, said bushing holding said bearing in a tight fit in said recess in said housing, said bushing having a part spherical shaped periphery, said recess being of part-spherical shape in cross section and adapted to fit the correspondingly shaped periphery of the bushing whereby the outer race of the bearing is resiliently gripped and thereby held against rotary movement and whereby the bearing as a whole is given a self-aligning characteristic, a pair of opposing outer rigid casing members which are shaped exteriorly to fit the accommodating annular recess in the rigid housing partly encasing said resilient bushing as regards its outer surfaces, whereby excessive "flow" of the material of the bushing is prevented and the outer surfaces thereof are protected against rapid and excessive wear, the construction being such that the bushing is sandwiched between the inner rigid lining and the outer rigid casing members and which lining and casing members are not directly connected to one another.

2. A bearing block as claimed in claim 1, and wherein the inner rigid lining is split into two half parts to facilitate assembly of the several parts of the bearing, and to allow for axial compression for purposes of gripping the outer race of the said antifriction bearing.

3. A bearing block as claimed in claim 1, and wherein the inner lining and the outer casing members are permanently bonded to the bushing.

4. A bearing block as claimed in claim 1, and wherein the inner lining parts and the outer casing members are of hollow annular form.

5. A bearing block as claimed in claim 1, and wherein the outer casing members are in the form of two co-acting parts and are of hollow semi-circular form.

6. A bearing block as claimed in claim 1, and wherein the outer peripheral surfaces of the outer casing members are of part-spherical form in cross section and are arranged to fit snugly into a correspondingly shaped internal accommodating recess in the bearing block housing so that sliding movement between these surfaces and the surface of said accommodating recess is possible, whereby the bearing block is fully self-aligning.

7. A bearing block as claimed in claim 1, and wherein the inner lining is split into two half parts and together with the two opposing outer casing members is bonded to the resilient bushing so that spaces are left between their inner opposing edges to allow for prestressing of the resilient bushing and to permit resilient gripping of the outer race of the bearing, thereby permitting a restricted amount of "flow" of the bushing material when under load so as to give a resilient mounting to the shaft journalled in the bearing.

8. A bearing block as claimed in claim 1 in which the inner lining is split into two half parts and the inner sides of said half parts as also the inner sides of the outer casing members are provided with inwardly directed flanges.

9. A bearing block as claimed in claim 1, and wherein both the inner lining and the outer casing members are of metal.

10. A bearing block as claimed in claim 1, and wherein projections are arranged on the outer periphery of the bushing, the accommodating annular recess of the bearing housing having corresponding recesses therein, said projections engaging in said recesses and adapted to prevent any creeping rotary movement of the bushing as a whole.

11. An improved bearing block as claimed in claim 1, and wherein full self-aligning characteristics are not required, fixing devices are provided to prevent relative oscillating movement of the antifriction bearing assembly with respect to its accommodating part-spherical recess in the housing.

12. An improved bearing block as claimed in claim 1, wherein in cases where full self-aligning characteristics are not required, fixing devices are provided to prevent relative oscillating movement of the antifriction bearing assembly with respect to its accommodating part-spherical recess in the housing, and wherein said fixing devices consist of circlips arranged to be inserted in suitable grooves provided in the bearing housing at each side so as to be in contact with the outer surfaces of the two opposing casing members.

13. An improved bearing block as claimed in claim 1, and wherein the bearing housing is split into two half parts in the same plane as the two outer casing members and said housing parts are arranged to be clamped together to impart a compressing action to the opposing casing members for the purpose of compressing the resilient bushing and thereby securing the antifriction bearing.

14. An improved bearing block as claimed in claim 1, and wherein means are provided to enable more axial compressive pressure to be applied to one side of the bushing than to the diametrically opposite side so as thereby to cause displacement of the antifriction bearing in a direction at right angles to the axis thereof for adjusting the alignment of a shaft journalled in the bearing or for counteracting such displacement.

15. An improved bearing block as claimed in claim 1, and wherein means are provided to enable more axial compressive pressure to be applied to one side of the bushing than to the diametrically opposite side so as thereby to cause displacement of the antifriction bearing in a direction at right angles to the axis thereof, for adjusting the alignment of a shaft journalled in the bearing or for counteracting such displacement, said means consisting of adjusting studs passing through tapped holes in side flanges of the bearing housing, which studs are arranged so that their inner ends by bearing against the outer surfaces of the casing members are adapted to cause inward canting movement thereof so as thereby to increase the compressive pressure on the material of the bushing sandwiched therebetween at, for instance, the bottom side of the bearing, suitable recesses, shoulders or the like being provided in the casing members to receive the ends of the studs.

16. An improved bearing block as claimed in claim 1, and wherein means are provided to enable more axial compressive pressure to be applied to one side of the bushing than to the diametrically opposite side so as thereby to cause displacement of the antifriction bearing in a direction at right angles to the axis thereof, for adjusting the alignment of a shaft journalled in the bearing or for counteracting such displacement, said means consisting of adjusting studs passing through tapped holes in side flanges of the bearing housing, which studs are arranged so that their inner ends by bearing against the outer surfaces of the casing members are adapted to cause inward canting movement thereof so as thereby to increase the compressive pressure on the material of the bushing sandwiched therebetween, at, for instance, the bottom side of the bearing, suitable recesses, shoulders or the like being provided in the casing members to receive the ends of the studs, the inner ends of said adjusting studs being arranged to engage in recesses in a pressure ring let into an annular recess in the outside of each casing member, which pressure rings are rotatable in said recesses to permit creeping rotary movement of the antifriction bearing assembly, which thereby allows of even wear of the bearing surfaces taking place.

17. An improved bearing block as claimed in claim 1, and wherein one half of the split resilient bushing is made of harder resilient material than the other half and this harder half is arranged to take the bearing pressure.

18. An improved bearing block as claimed in claim 1, and wherein projections are arranged on the outer periphery of the bushing to engage in corresponding recesses provided in the accommodating annular recess of the bearing housing so as to prevent creeping rotary movement of the bushing as a whole.

19. An improved bearing block as claimed in claim 1, and wherein the antifriction bearing locating groove in the resilient bushing parts is eccentrically disposed therein to provide greater thickness of resilient material at the position where maximum bearing load is concentrated.

20. An improved bearing block as claimed in claim 1, and wherein a spacer is provided extending between said casing members and located in the circumferential surface of the resilient bushing at a position diametrically opposite to the position where the maximum bearing load is concentrated on the bushing for maintaining said casing members in parallel spaced relation.

THOMAS WATT.

REFERENCES CITED

The following references are of record in the file of this patent:

UNITED STATES PATENTS

| Number | Name | Date |
|---|---|---|
| 1,851,561 | Banninger | Mar. 29, 1932 |
| 1,883,882 | Davis | Oct. 25, 1932 |
| 1,920,436 | Riker | Aug. 1, 1933 |
| 2,292,291 | Olsen | Sept. 7, 1937 |
| 2,304,595 | Prentice | Dec. 8, 1942 |

FOREIGN PATENTS

| Number | Country | Date |
|---|---|---|
| 50,950 | Sweden | May 18, 1918 |